United States Patent [19]

Mauthe

[11] Patent Number: 4,652,175

[45] Date of Patent: Mar. 24, 1987

[54] PROCESS AND DEVICE FOR SECURING A FASTENING MEMBER IN A BOREHOLE

[75] Inventor: Peter Mauthe, Kleinberghofen, Fed. Rep. of Germany

[73] Assignee: Hilti Aktiengesellschaft, Fürstentum, Liechtenstein

[21] Appl. No.: 689,665

[22] Filed: Jan. 8, 1985

[30] Foreign Application Priority Data

Jan. 13, 1984 [DE] Fed. Rep. of Germany ....... 3401089

[51] Int. Cl.$^4$ .............................................. E21D 20/02
[52] U.S. Cl. ................................... 405/260; 405/261; 405/303
[58] Field of Search ............... 405/260, 261, 303, 258, 405/262; 52/309.17

[56] References Cited

U.S. PATENT DOCUMENTS

| 3,030,234 | 4/1962 | McClinton | 52/309.17 X |
| 4,075,374 | 2/1978 | Jorgenson et al. | 52/309.17 X |
| 4,185,431 | 1/1980 | Brownlee | 52/309.17 |

FOREIGN PATENT DOCUMENTS

| 0748621 | 12/1966 | Canada | 405/263 |
| 0005987 | 12/1979 | European Pat. Off. | 405/261 |
| 1293619 | 10/1972 | United Kingdom | 405/261 |
| 0859545 | 9/1981 | U.S.S.R. | 405/266 |

*Primary Examiner*—Dennis L. Taylor
*Attorney, Agent, or Firm*—Toren, McGeady and Goldberg

[57] ABSTRACT

Before injecting a flowable hardenable mass for anchoring a fastening member in a borehole, a coating solution is sprayed into the borehole for securing any drilling dust remaining on the borehole surface. A device for introducing the hardenable mass into the borehole includes a feed duct for injecting the mass. A container holding a coating solution is provided in the device. Another duct laterally surrounds the feed duct and forms an annular passage and a tube extends from the container to the annular passage for spraying the solution onto the borehole surface.

4 Claims, 2 Drawing Figures

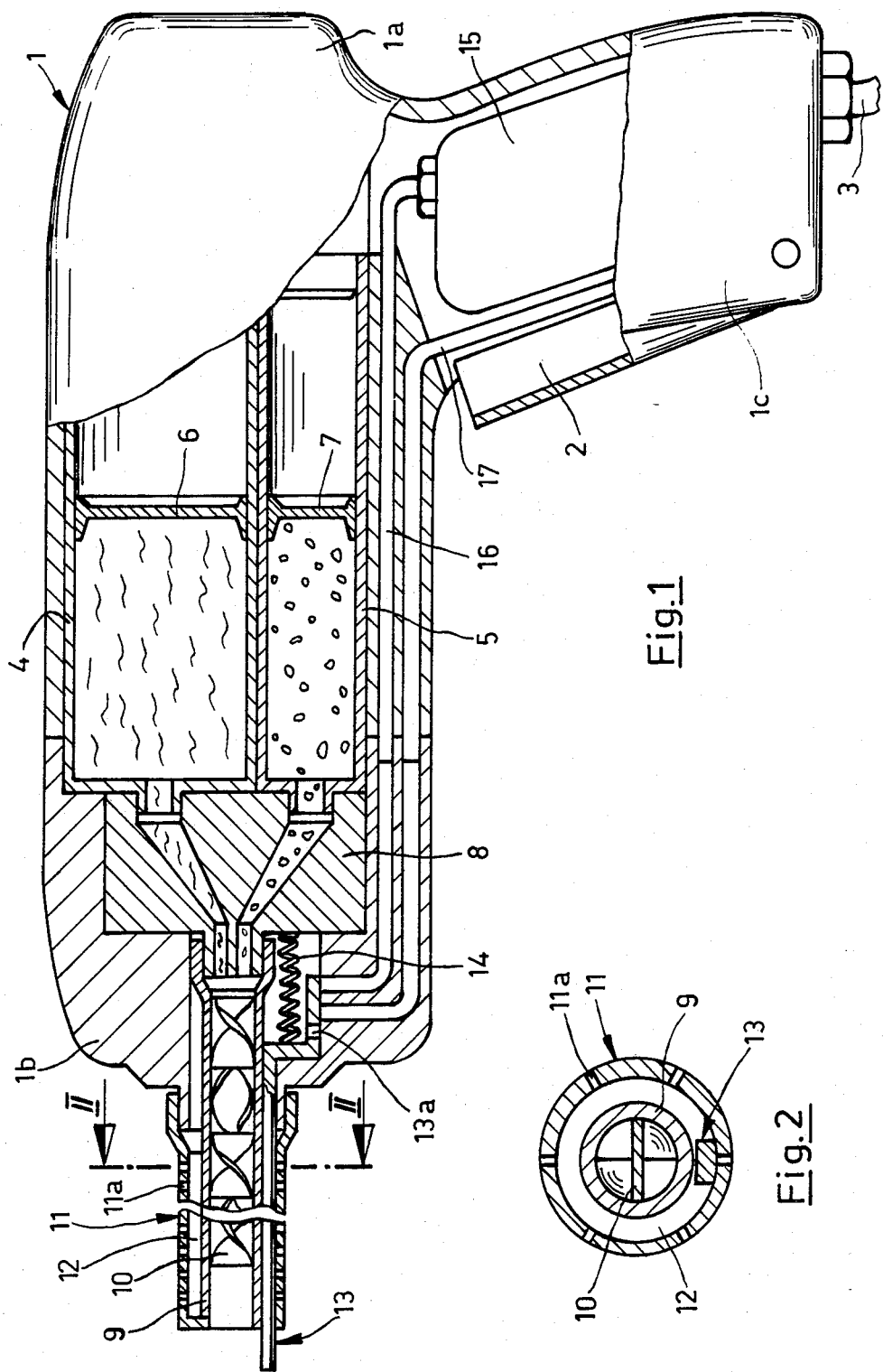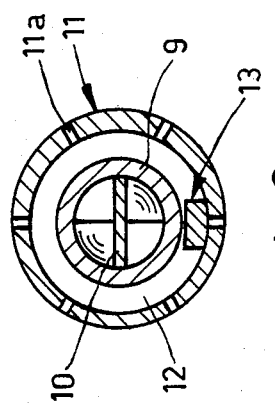

PROCESS AND DEVICE FOR SECURING A FASTENING MEMBER IN A BOREHOLE

BACKGROUND OF THE INVENTION

The present invention is directed to a process and a device used in anchoring a fastening member in a borehole formed in a hard receiving material, such as rock, concrete, brick or the like, by using a flowable hardenable material, preferably a multi-component mass.

Basically, two different processes are used for anchoring fastening members in a flowable hardenable mass.

In one process, the components forming the mass are located in separate parts of a destructible container. The container is inserted into a borehole and the container is broken by driving a fastening member into the borehole. By turning the fastening member as it is driven in, a thorough mixing of the components is achieved in the borehole. The movement of the mass injected into the borehole picks up the drilling dust remaining on the borehole surface after it has been cleaned so that the dust forms a filler material in the hardenable mass. To the extent that the drilling dust is adequately removed from the borehole in this known process, a good adhesive bond of the hardenable mass with the borehole surfaces takes place. This process can be economically justified for the placement of single fastening members. The fabrication of the container, however, is relatively complicated and, as a result, expensive. Moreover, the time required to carry out the mixing process is so great that the method is not economical for quantity production.

In the other process, the components of the flowable hardenable material are stored in separate containers positioned within a mixing and metering device. The containers hold enough of the hardenable mass for anchoring a plurality of the fastening members. The separate components are mixed together directly before they are dispensed from the device and are introduced into the borehole as a mixture of the hardenable mass. After the mass is injected into the borehole, the fastening member can be inserted into the borehole where it is to be anchored without any complicated auxiliary placement means and with a partial displacement of the hardenable mass from the borehole. In this method there is relatively little relative movement of the hardenable mass with respect to the borehole surface.

From actual practice it has been noted, even after an intensive cleaning of the borehole, that a portion of the drillings produced during the formation of the borehole still adhere to the borehole surface. Such drillings or drilling dust form a layer separating the hardenable mass from the surface of the borehole in the receiving material. Such a situation leads to regions of reduced strength within the borehole. As a result, the anchored strength of the fastening members is likely to be considerably reduced. The anchored strength, however, can only be determined after the fastening member has been secured and stressed.

SUMMARY OF THE INVENTION

Therefore, the primary object of the present invention is to provide a process and a device for carrying out the procedure by which an economical and dependable anchoring fastening member is effected.

In accordance with the present invention the surface of the borehole is cleaned in a known manner and, subsequently, any drillings or drilling dust remaining on the borehole surface is secured to the surface by spraying a coating solution into the borehole. Next, the flowable hardenable material is injected into the borehole and finally a fastening member to be anchored is inserted into the hardenable material in the borehole.

Cleaning the borehole can be performed in a variety of known ways, such as by scrubbing, suctioning or blowing out the borehole. Any drilling dust remaining on the surface of the borehole is secured to the surface by a coating solution. When a coating solution is used, the requirements for cleaning a borehole are lower than in the procedures mentioned above. As a result, the drilling dust bound to the borehole surface plays an active part in securing the fastening member within the borehole.

After the drilling dust has been fixed to the borehole surface, the flowable hardenable mass premixed in the device can be injected into the borehole, after which the fastening member is pressed into the hardenable mass in the borehole. Using such a device, it is not necessary to provide any subsequent mixing of the components of the hardenable mass in the borehole.

A variety of chemicals may be used as the coating solution. To afford a rapid reaction it is considered suitable to utilize a coating solution which reacts under the influence of air. For example, solutions of unsaturated oils can be employed and the drying time for such oil, that is, the time for the transition from the liquid to the solid state, can be reduced by adding drying agents. Metal soaps can be used as drying agents where the metals may be cobalt, manganese or lead.

Another advantageous possibility is to utilize a coating solution which reacts under the influence of moisture. Solutions of polyurethane-prepolymers may be employed where the residual isocyanate groups react with the moisture present in the air or in the receiving material.

It would also be appropriate to use a coating solution made up of several components which react with one another. In such a procedure the components of the coating solution would be mixed together immediately before they are sprayed into the borehole, so that a premature reaction is prevented.

Where the receiving material is fissured or porous, it would be possible to utilize solutions of waxes, hydrocarbon resins, collodion-wool, polyvinylacetate in organic solvents such as esters, hydrocarbons or the like. When such materials are used, the hardenable mass can be introduced into the borehole immediately following the spraying of the coating solution. The coating solution could be injected by a device separate from the metering device for the hardenable mass. Such a procedure would be cumbersome, however, and require additional time. Therefore, it is advantageous to provide a device with a container or containers for the hardenable mass and a feed pipe for conveying the mass into a borehole, with a separate container for the coating solution and a tube extending from the container out of the device. As a result, the treatment of the borehole surface and the injection of the hardenable mass can be carried out using the same device. In practice one borehole after another can be cleaned, pretreated and filled with the hardenable mass without any loss of time. The tubular members or ducts for the hardenable mass and the coating solution are interchangeable and can be adapted for the particular borehole to be filled.

The duct for supplying the hardenable material and the duct for supplying the coating solution can be positioned at various locations on the device and introduced into the borehole, one following the other. In a simplified arrangement, the duct for the coating solution can be positioned around the duct for the hardenable mass so that an annularly shaped passageway is provided between them with radial openings formed from the duct carrying the coating solution. As a result, the ducts can be arranged coaxially with one another and inserted as a unit into the borehole to be filled. With such a device it would be practically impossible to overlook the treatment of the borehole surface with the coating solution.

Advantageously, the duct conveying the coating solution can be connected to a source of compressed air for spraying the solution. The compressed air source can be incorporated into the device as a compressed air reservoir or it can be in the form of a flexible line extending between the device and a supply of compressed air. The compressed air can also be used along with suitable control means for cleaning the borehole prior to the injection of the coating solution. Furthermore, the process steps of cleaning the borehole, injecting the coating solution and the subsequent injecting of the hardenable mass can be carried out automatically.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side elevational view, partly in section, of a device embodying the present invention; and FIG. 2 is a cross-sectional view, on an enlarged scale, taken along the line II—II in FIG. 1.

DETAILED DESCRIPTION OF THE INVENTION

The device illustrated in FIGS. 1 and 2 includes a handheld pistol-like housing 1 made up of a rear part 1a and a front part 1b detachably connected together. A handle 1c extends downwardly from the rear end of the rear part 1a of the housing 1. A trigger-like lever 2 is mounted in the handle 1c and metered amounts of a hardenable mass can be ejected from the housing when the lever is pressed into the handle. An external connection 3 from a compressed air source is located at the lower end of the handle. Two receptacles 4, 5 for separate components of a hardenable multi-component mass are located in the rear part 1a of the housing 1. A compression piston 6, 7 is located in each of the receptacles 4, 5 for pressing the components out of the receptacles. The pistons can be driven by compressed air or some mechanical arrangement. The left-hand end of the housing as viewed in FIG. 1 is the front end of the device. The ends of the receptacles 4, 5 closer to the front end of the device each have a port through which the component within the receptacle flows into a muzzle piece 8. The muzzle piece 8 forms a separate passageway leading from each of the receptacles 4, 5. A feed duct 9 is fitted over a cylindrical outlet extension of the muzzle piece 8. The duct 9 forms an outlet passageway for the components of the hardenable mass. Axially extending mixing elements 10 are located within the duct 9 and mix the components of the hardenable mass entering from the separate passages in the muzzle piece 8. The components of the hardenable mass are mixed as they flow through the duct 9 and further mixing is not needed once the hardenable mass exits from the front end of the duct.

Another duct 11 is fitted onto the front end of the front part 1b of the housing and laterally encloses the duct 9. The inside surface of the duct 11 is spaced outwardly from the outside surface of the duct 9 so that an annular passageway 12 is provided between them. The front end of the annular passageway 12 is closed. A slide bar 13 extends through the annular passage 12 in parallel relation with the axis of the duct 9 and it extends forwardly of the front end of the ducts 9, 11. Initially, the front end of the slide bar 13 is maintained forwardly of the front end of the duct 9 by a spring 14 mounted within the housing and extending between the front of the muzzle piece 8 and a stepped part of the slide bar. The front ends of the ducts 9 and 11 are shown in a common plane. In the handle 1c, a container 15 of a coating solution is provided. A tube 16 extends from the container 15 through the housing into the front part 1b. In addition, another tube 17 a compressed air line extends from the handle along with the tube 16 into the front part 1b. The front ends of the tubes 16 and 17 open into the annular passage 12. As viewed in FIG. 1, the tubes 16 and 17 are closed by the rear end of the slide bar 13.

When the combination of the ducts 9, 11 are inserted into a borehole, the front end of the slide bar 13 projecting forwardly from the ducts will abut against the bottom of the borehole and, if the device is pressed further into the borehole, the slide bar is displaced rearwardly against the force of the pressure spring 14 toward the handle 1c. Since the outlet from the tube 17 is located closer to the front end of the device than the outlet from the tube 16, initially an aperture 13a in the stepped part of the slide bar uncovers the outlet from the tube 17. As the slide bar is pressed further into the housing the aperture 13a will register with the outlet from the tube 16. As a result, initially compressed air can be directed into the borehole and then the coating solution can flow from the container 15 through the tube 16 passing through the aperture 13a into the annular passage 12. A number of radially directed openings 11a are provided in the outer duct 11 so that the compressed air or the coating solution flowing into the passage 12 is directed radially outwardly against the borehole surface. As a result, first the borehole is cleaned by the flow of compressed air and then the coating solution is sprayed outwardly against the borehole surface. Following the spraying of the coating solution, the hardenable mass can be introduced into the borehole by withdrawing the device out of the borehole. The fastening member can then be pressed into the hardenable mass located within the borehole.

As the device is withdrawn from the borehole, the spring 14 returns the slide bar 13 into the original position shown in FIG. 1. As the slide bar is returned into the original position, the flowable hardenable mass can be conducted through the duct 9 into the borehole. The discharge of the hardenable mass is carried out by pressing the trigger-like lever into the handle.

As can be seen in FIG. 2, the slide bar 13 has a generally rectangular shape, though the shape of the bar is not significant. The radial openings 11a are spaced apart angularly about the axis of the duct 11 and they are also spaced apart in the axial direction of the duct.

While specific embodiments of the invention have been shown and described in detail to illustrate the application of the inventive principles, it will be understood that the invention may be embodied otherwise without departing from such principles.

I claim:

1. Process of anchoring a fastening member in a borehole drilled into a hard receiving material, such as rock, concrete, brick or the like, where drilling dust remains in the borehole, and using a flowable hardenable mass for securing the fastening member in the borehole, comprising the steps of at least partially cleaning the borehole of drilling dust, injecting a coating solution onto the surface of the borehole for binding any remaining drilling dust on the borehole surface, then injecting the flowable hardenable mass into the borehole, and finally inserting a fastening member into the hardenable mass in the borehole for anchoring the fastening member.

2. Process, as set forth in claim 1, including using a coating solution which reacts on contact with air.

3. Process, as set forth in claim 1, including using a coating solution which reacts with moisture.

4. Process, as set forth in claim 1, including using a coating solution made up of several components which react with one another.

* * * * *